United States Patent
Yoon et al.

(10) Patent No.: US 11,619,272 B2
(45) Date of Patent: Apr. 4, 2023

(54) DOG CLUTCH ENGAGEMENT METHOD OF ELECTRIC FOUR-WHEEL DRIVE VEHICLE

(71) Applicants: Hyundai Motor Company, Seoul (KR); Kia Corporation, Seoul (KR)

(72) Inventors: Dong Pil Yoon, Incheon (KR); Se Hoon Park, Gyeonggi-do (KR); Won Seok Choi, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/550,428

(22) Filed: Dec. 14, 2021

(65) Prior Publication Data

US 2022/0194224 A1   Jun. 23, 2022

(30) Foreign Application Priority Data

Dec. 21, 2020 (KR) .......... 10-2020-0179390

(51) Int. Cl.
*F16D 23/10* (2006.01)
*F16D 48/06* (2006.01)

(52) U.S. Cl.
CPC .......... *F16D 23/10* (2013.01); *F16D 48/06* (2013.01); *F16D 2500/10462* (2013.01); *F16D 2500/30409* (2013.01); *F16D 2500/30415* (2013.01); *F16D 2500/3109* (2013.01); *F16D 2500/3115* (2013.01); *F16D 2500/7041* (2013.01); *F16D 2500/70436* (2013.01); *F16D 2500/70458* (2013.01)

(58) Field of Classification Search
CPC . F16D 2500/50638; F16D 2500/50607; F16D 2500/70436; F16D 2500/30409
See application file for complete search history.

(56) References Cited

U.S. PATENT DOCUMENTS

| | | | | |
|---|---|---|---|---|
| 5,827,148 A | * | 10/1998 | Seto | B60W 10/04 74/336 R |
| 2008/0262685 A1 | * | 10/2008 | Asplund | F16H 61/2807 701/64 |
| 2017/0182887 A1 | * | 6/2017 | Ogawa | B60K 17/344 |

FOREIGN PATENT DOCUMENTS

| WO | WO-2011076487 A1 | * | 6/2011 | ........ B60K 6/52 |
|---|---|---|---|---|
| WO | WO-2016198510 A1 | * | 12/2016 | |

* cited by examiner

*Primary Examiner* — Timothy Hannon
(74) *Attorney, Agent, or Firm* — Fox Rothschild LLP

(57) ABSTRACT

A dog clutch engagement method of an electric four-wheel drive vehicle includes steps of: when dog clutch engagement is requested during driving, determining a target synchronization speed of the input gear to be a sum of an estimated speed and an offset speed of the output gear; operating a drive unit so that an input gear follows the target synchronization speed; when an actual speed of the input gear reaches the target synchronization speed, moving a sleeve to a meeting position at which the sleeve is in contact with the input gear; and when the actual speed of the input gear is synchronized with an actual speed of the output gear, transporting the sleeve to an engagement position at which the input gear and the output gear are coupled.

7 Claims, 16 Drawing Sheets

FIG. 1
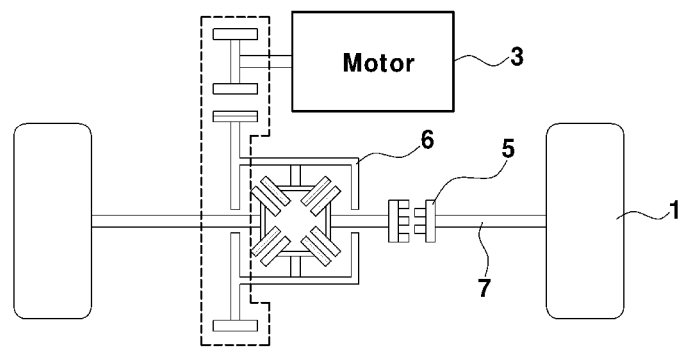
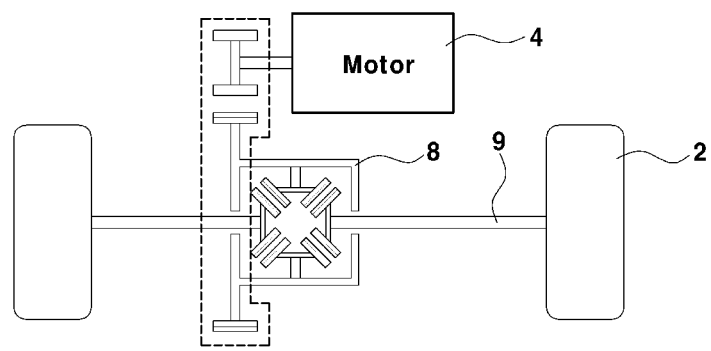

ENGAGE ←—→ DISENGAGE

[2WD]  [Meeting]  [4WD]

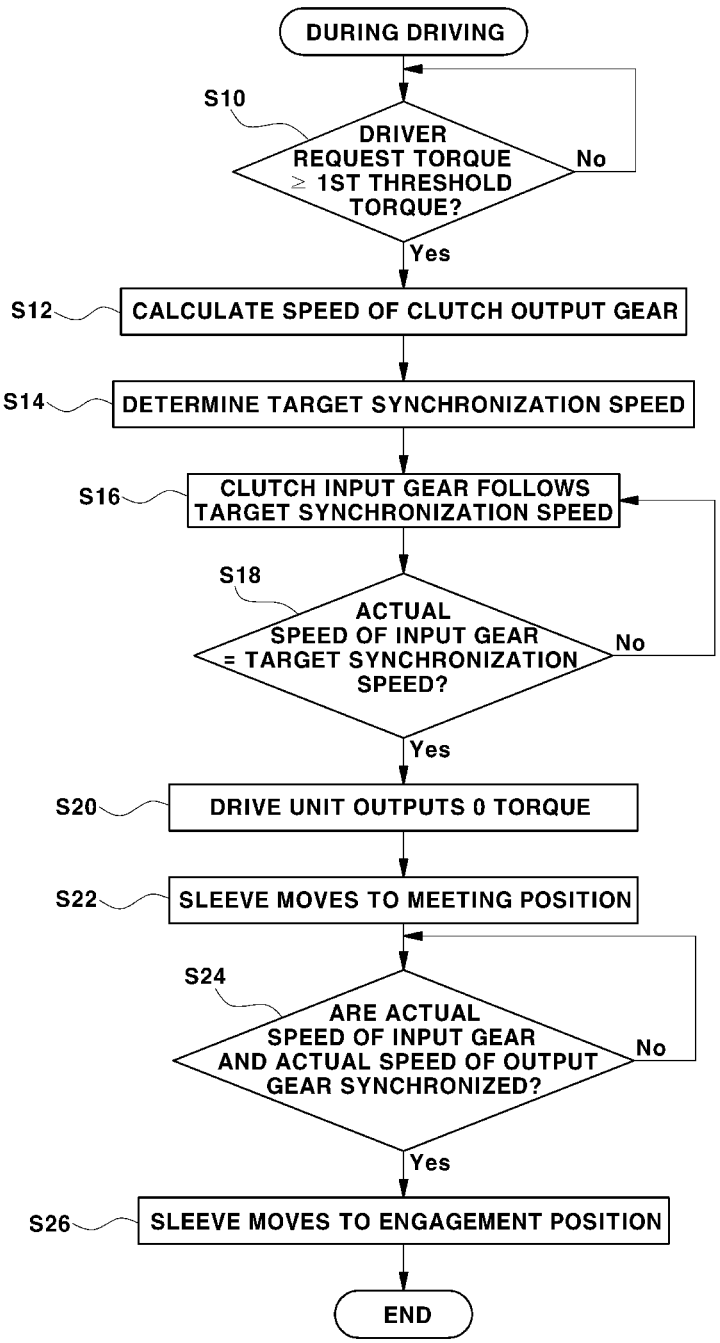

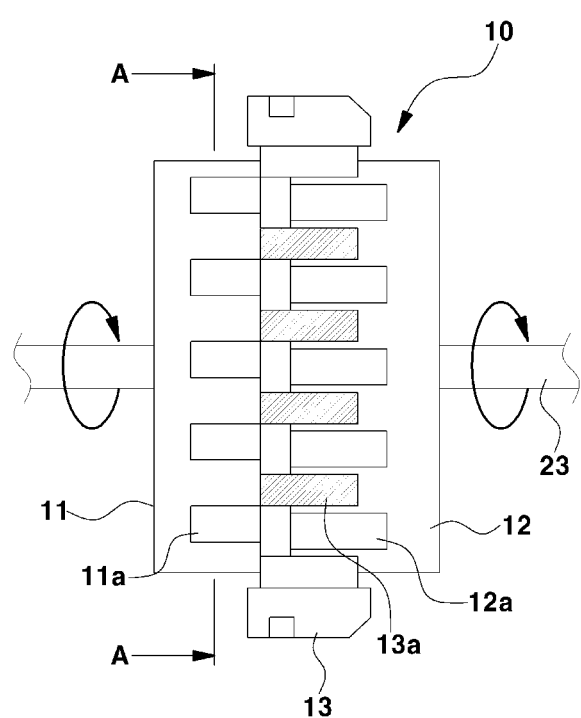

⟨ A-A VIEW ⟩

< B-B VIEW >

< C-C VIEW >

< D-D VIEW >

DOG CLUTCH ENGAGEMENT METHOD OF ELECTRIC FOUR-WHEEL DRIVE VEHICLE

CROSS REFERENCE TO RELATED APPLICATION

The present application claims under 35 U.S.C. § 119(a) the benefit of Korean Patent Application No. 10-2020-0179390, filed Dec. 21, 2020, the entire contents of which are incorporated by reference herein.

BACKGROUND

(a) Technical Field

The present disclosure relates to a dog clutch engagement method of an electric four-wheel drive vehicle, more particularly, to the dog clutch engagement method configured to effectively reduce impact and noise generated by a dog clutch during changes in a drive mode.

(b) Description of the Related Art

As is well known in the art, hybrid vehicles, battery electric vehicles, hydrogen fuel-cell vehicles, and the like are provided with an electric motor as a drive source. Such vehicles are referred to as electric vehicles.

In an electric four-wheel drive vehicle among such electric vehicles, for example, at least one of an engine and a main drive motor is connected to main drive wheels and an auxiliary drive motor is connected to auxiliary drive wheels.

Such an electric four-wheel drive vehicle uses a power cut-off device referred to as a dog clutch (or disconnector) to remove drag loss of the auxiliary drive motor. In an electric four-wheel drive vehicle using rear wheels as main drive wheels, the dog clutch is mounted on a front wheel drive shaft.

In driving in a two-wheel drive mode in which power transmission to the auxiliary drive wheels is not necessary, the dog clutch disconnects the auxiliary drive motor and the auxiliary drive wheels in order to prevent mechanical drag loss due to constant rotation of the drive line of the auxiliary drive wheels, and resultant fuel efficiency reduction.

In a case in which the auxiliary drive motor is connected to the auxiliary drive wheel in the two-wheel drive mode, zero (0) torque control over the auxiliary drive motor is required in order to prevent drag loss caused by counter electromotive force applied to the auxiliary drive motor through the auxiliary drive wheels, whereby loss in electrical energy for zero torque control occurs.

Therefore, it is necessary to prevent mechanical drag loss and electrical drag loss by disengaging the dog clutch when the vehicle drives in the two-wheel drive mode.

As is well known in the art, the dog clutch has a structure in which power transmission is enabled by engagement of an input gear connected to the auxiliary drive motor and an output gear connected to the auxiliary drive wheels. For smooth rotation, a distance (i.e., backlash) is inevitably present between the teeth of the input gear and the teeth of the sleeve mounted on the output gear.

In other words, dog clutch has the backlash between the teeth of the input gear and the teeth of the sleeve when the input gear and the sleeve engage with each other.

However, the backlash causes impact and noise to the dog clutch in acceleration driving and deceleration driving. Referring to FIGS. 14 and 15 (RELATED ART), a dog clutch 100 has gear teeth collision and impact noise in acceleration driving and deceleration driving, due to the backlash present between teeth 111 of an input gear 110 and gear teeth 131 of a sleeve 130.

When the backlash is reduced in order to reduce the impact and the noise, mechanical drag loss occurring in the drive line of the auxiliary drive wheels may be increased. When the backlash is increased in order to reduce the drag loss, the impact and the noise occurring in the dog clutch in acceleration driving and deceleration driving may not be reduced.

The backlash of the dog clutch may reduce acceleration response and linearity by reducing increases in torque fluctuation during acceleration driving, reduce deceleration response and linearity by reducing decreases in torque fluctuation during deceleration driving, and reduce braking response and linearity by delaying a point in time of conversion from the two-wheel drive mode to the four-wheel drive mode. Accordingly, the backlash makes it impossible to prevent fuel efficiency reduction and drivability degradation.

The foregoing is intended merely to aid in the understanding of the background of the present disclosure, and is not intended to mean that the present disclosure falls within the purview of the related art that is already known to those skilled in the art.

SUMMARY

Accordingly, the present disclosure discloses a dog clutch engagement method of an electric four-wheel drive vehicle, the method being able to effectively prevent impact and noise caused by the backlash of a dog clutch in acceleration driving and deceleration driving.

In order to achieve the above objective, according to one aspect of the present disclosure, there is provided a method of engaging a dog clutch of an electric four-wheel drive vehicle, in which the dog clutch comprises an input gear connected to a drive unit, an output gear connected to a drive wheel, and a sleeve engaging or disengaging the input gear and the output gear while being fitted to the output gear.

The method may include: when dog clutch engagement is requested during driving, determining a target synchronization speed of the input gear to be a sum of an estimated speed and an offset speed of the output gear; operating the drive unit so that the input gear follows the target synchronization speed; when an actual speed of the input gear reaches the target synchronization speed, moving the sleeve to a meeting position at which the sleeve is in contact with the input gear; and when the actual speed of the input gear is synchronized with an actual speed of the output gear, transporting the sleeve to an engagement position at which the input gear and the output gear are coupled.

When the actual speed of the input gear reaches the target synchronization speed, the drive unit may be controlled to output zero torque in order to maintain the target synchronization speed of the input gear.

In the step of moving the sleeve to the engagement position at which the input gear and the output gear are coupled, the sleeve may slide to the engagement position, with surfaces of gear teeth thereof being in contact with teeth surfaces of the input gear.

The drive unit may be one more from among a front-wheel motor generating driving force of a front wheel and a rear-wheel motor generating driving force of a rear wheel.

The present disclosure may provide the following effects.

First, it is possible to prevent gear teeth collision and impact noise caused by the backlash of the drive line including the dog clutch in acceleration driving or deceleration driving. The drive line may include a motor, a reducer, a differential, and a drive shaft connected to the auxiliary drive wheels.

Second, it is possible to reduce fuel efficiency reduction caused by a decrease in the mechanical backlash of the drive line including the dog clutch.

Third, it is possible to improve initial response of the dog clutch in acceleration driving and deceleration driving.

Fourth, it is possible to improve drive torque fluctuation and braking torque fluctuation in acceleration driving and deceleration driving, thereby improving acceleration linearity and deceleration linearity.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a view illustrating an example of an electric four-wheel drive vehicle to which a dog clutch engagement method according to the present disclosure is applicable;

FIG. 8 is a flowchart illustrating a dog clutch engagement method according to the present disclosure in acceleration driving;

FIG. 9A is a view illustrating a state in which the sleeve has arrived at a meeting position;

DETAILED DESCRIPTION OF THE DISCLOSURE

Figure 2:
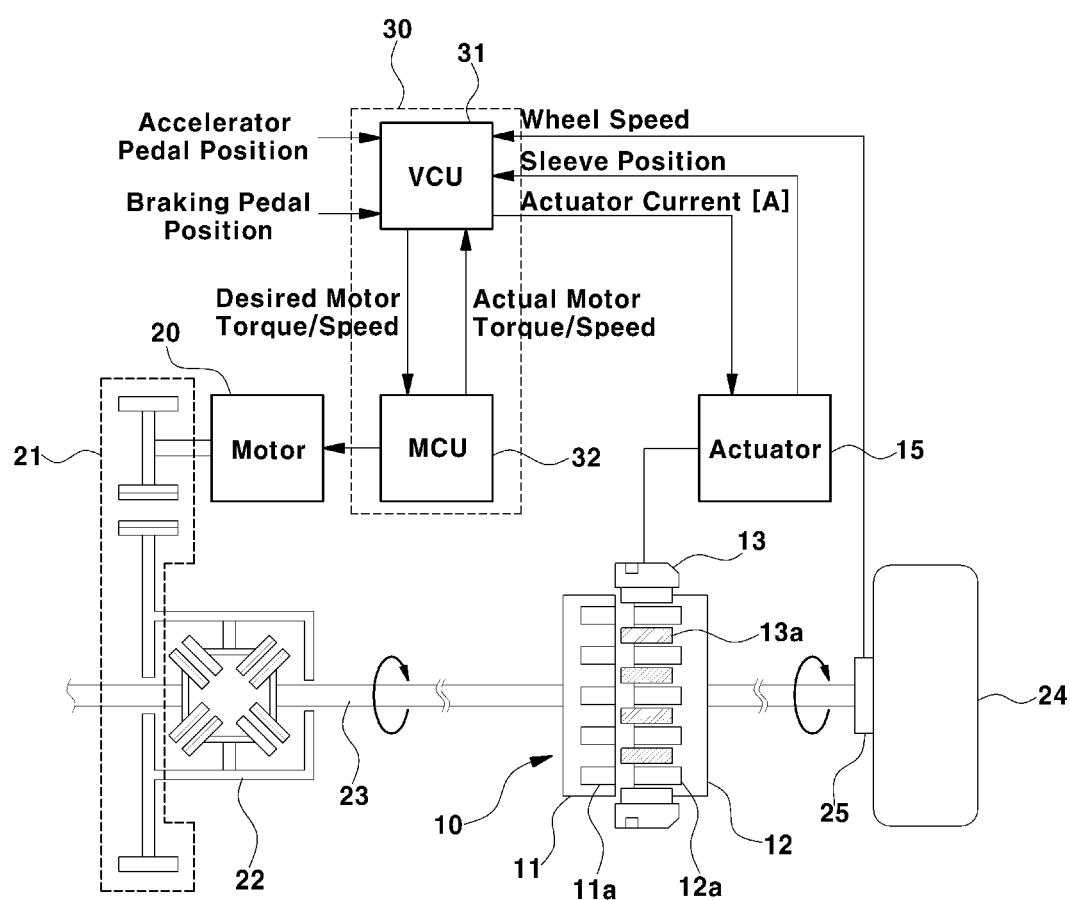
FIG. 2 is a view illustrating the configuration of a system performing a dog clutch engagement process according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described with reference to the accompanying drawings. The features illustrated in the drawings are input in the form of diagrams for a better understanding of the embodiments of the present disclosure and may actually be implemented in different shapes.

First, a configuration of an electric four-wheel drive vehicle including a dog clutch will be briefly described in order to assist in the understanding of the present disclosure.

FIG. 1 is a view illustrating an example of an electric four-wheel drive vehicle to which a dog clutch engagement method according to the present disclosure is applicable.

As illustrated in FIG. 1, an electric four-wheel drive vehicle may be configured such that a motor 3 for driving front wheels 1 and a motor 4 for driving rear wheels 2 are disposed independently of each other. Specifically, the electric four-wheel drive vehicle may be provided with the front-wheel drive motor (hereinafter, referred to as the "front-wheel motor") 3 for driving the front wheels 1 and the rear-wheel drive motor (hereinafter, referred to as the "rear-wheel motor") 4 for driving the rear wheels 2.

The electric four-wheel drive vehicle as described above may drive in one mode of a four-wheel drive (4WD) mode and a two-wheel drive (2WD) mode. In four-wheel driving, a vehicle drives using driving force of both the front-wheel motor 3 and the rear-wheel motor 4. In two-wheel driving, the vehicle drives using one of the driving force of the front-wheel motor 3 and the driving force of the rear-wheel motor 4. The drive motor and the drive wheels that are not used in two-wheel driving are determined in advance.

The drive wheels not used in two-wheel driving may be referred to as auxiliary drive wheels. When separate power is not applied to the auxiliary drive wheels, i.e. the vehicle is driving in the two-wheel drive mode, reverse driving force may be transmitted from the auxiliary drive wheels to an auxiliary drive unit, thereby causing drag loss.

Thus, in two-wheel driving, it is required to prevent the drag loss by blocking the reverse driving force transmitted from the auxiliary drive wheels. In this regard, a dog clutch 5 may be disposed on the drive shaft of the auxiliary drive wheels.

The dog clutch 5 may engage power transmission from the auxiliary drive unit to the auxiliary drive wheel in four-wheel driving. In two-wheel driving, the dog clutch 5 may disengage power transmission from the auxiliary drive unit to the auxiliary drive wheel in four-wheel driving. That is, power transmission through the drive shaft may be enabled and disabled by engaging or disengaging the dog clutch 5.

Thus, in two-wheel driving in which power transmission from the auxiliary drive unit to the auxiliary drive wheel is not necessary, the auxiliary drive unit and the auxiliary drive wheels may be disconnected by operating the dog clutch 5, thereby preventing drag loss and fuel efficiency reduction that would otherwise be caused by the reverse driving force of the auxiliary drive wheels.

In two-wheel driving of the vehicle, a drive unit generating the driving force may be a main drive unit, and a drive unit not generating the driving force may be the auxiliary drive unit. The auxiliary drive unit may be operated to generate the driving force in four-wheel driving.

Specifically, the auxiliary drive unit may be one motor of the front-wheel motor 3 generating driving force of the front wheels 1 and the rear-wheel motor 4 generating driving force of the rear wheels 2. Referring to FIG. 1, the auxiliary drive unit may be the front-wheel motor 3, while the main drive unit may be the rear-wheel motor 4. The front wheels 1 may be the auxiliary drive wheels, the rear wheels 2 may be the main drive wheels, and the dog clutch 5 may be disposed on a drive shaft 7 between the front wheels 1 and a front differential 6.

When the rear wheels 2 are the auxiliary drive wheels and the front wheels 1 are the main drive wheels, another dog clutch may be disposed on a drive shaft 9 between the rear wheels 2 and a rear differential 8.

Hereinafter, the dog clutch engagement method of an electric four-wheel drive vehicle according to the present disclosure will be described with reference to FIGS. 2 to 13 of the accompanying drawings.

FIG. 2 is a view illustrating the configuration of a system performing a dog clutch engagement process according to the present disclosure. As illustrated in FIG. 2, a dog clutch 10 may be disposed between a reducer 21 of a drive unit 20 and a drive wheel 24. Specifically, the dog clutch 10 may be disposed on a drive shaft 23 between a differential 22 and the drive wheel 24. The drive unit 20 may be a front-wheel motor or a rear-wheel motor, while the drive wheel 24 may be a front wheel or a rear wheel.

In addition, in this situation, the dog clutch 10 receives power from the drive unit 20 through the reducer 21 and the differential 22 and transmits the received power to the drive wheel 24.

Figure 3:
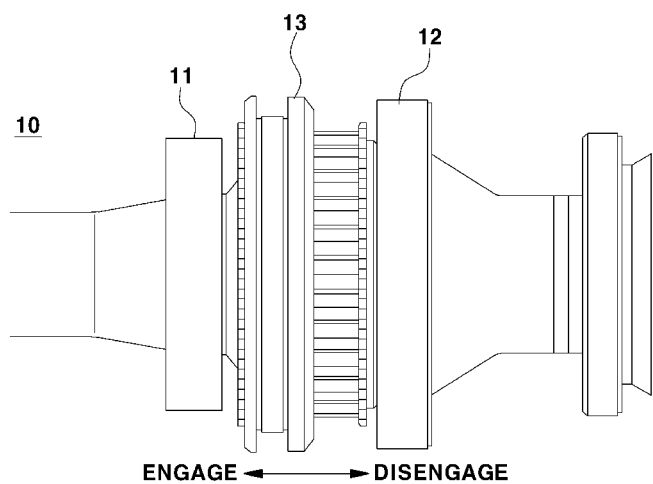
FIG. 3 is a side view illustrating an outer shape of the dog clutch illustrated in FIG. 2.

The dog clutch 10 includes components for engaging and disengaging the drive shaft 23 to transmit power. A configuration of the dog clutch 10 is illustrated in FIG. 3. The dog clutch 10 illustrated in FIG. 3 is substantially the same as the configuration of a typical dog clutch.

As illustrated in FIG. 3, the dog clutch 10 may include an input gear 11, an output gear 12, and a sleeve 13.

The input gear 11 is connected to the drive unit 20 to receive power from the drive unit 20. Specifically, the input gear 11 may be disposed in the reducer 21 and connected to the drive unit 20 through the differential 22 so as to receive the power from the drive unit 20 through the reducer 21 and the differential 22.

The output gear 12 is connected to the drive wheel 24 to transmit driving force, received from the input gear 11, to the drive wheel 24. Specifically, the output gear 12 may be disposed on the drive shaft 23 to transmit the power, received from the drive unit 20 through the input gear 11 and the sleeve 13, to the drive wheel 24.

The sleeve 13 may be fitted to an external portion of the output gear 12 and be configured to linearly move to engage or disengage the input gear 11 and the output gear 12. Specifically, the sleeve 13 may be coupled to the output gear 12 so as to axially slide and be configured to rotate integrally with the output gear 12. The sleeve 13 may slide toward the input gear 11 while being coupled to the output gear 12 so as to be coupled to the input gear 11.

Figure 4:
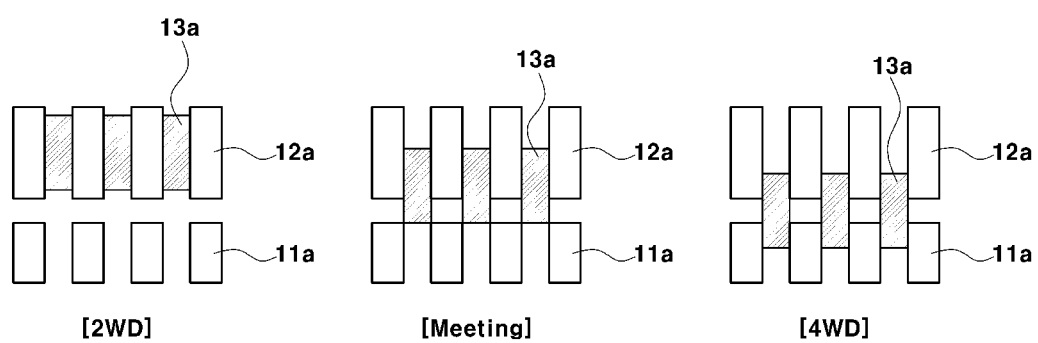
FIG. 4 is a view illustrating states of the dog clutch engagement process.

In four-wheel driving, the sleeve 13 may slide toward the input gear 11 while being in engagement with the output gear 12 so as to engage with the input gear 11, as illustrated in FIG. 4. That is, in four-wheel driving, the sleeve 13 may be engaged with both the input gear 11 and the output gear 12 so as to rotate integrally with the input gear 11 and the output gear 12.

In addition, in two-wheel driving, the sleeve 13 may return toward the output gear 12 or not move toward the input gear 11 so as to rotate integrally with only the output gear 12.

For the movement of the sleeve 13 as described above, the dog clutch 10 is connected to a sleeve actuator 15 for moving the sleeve 13, as illustrated in FIG. 2.

The sleeve actuator 15 may drive the sleeve 13 to linearly move toward the input gear 11 so as to engage with the input gear 11 or to return toward the output gear 12 so as to disengage from the input gear 11.

When the sleeve 13 is engaged with the input gear 11, the input gear 11 and the output gear 12 are engaged through the sleeve 13 so as to be integrally rotatable. When the sleeve 13 is disengaged from the input gear 11, the input gear 11 and the output gear 12 are disengaged through the sleeve 13 so as not to be integrally rotatable.

As is well known in the art, the sleeve actuator 15 may include a motor generating rotational force for moving the sleeve 13 and a fork converting the rotational force of the motor into straight driving force and transmitting the straight driving force to the sleeve 13.

Referring to FIG. 4, the engagement process of the dog clutch 10 may include a full disengagement step, a full engagement step, and a baulking step according to the movement position of the sleeve 13. The full disengagement step is prior to the start of the engagement of the input gear 11 and the output gear 12. In the full engagement step, the engagement of the input gear 11 and the output gear 12 is completed. In the baulking step, the engagement of the input gear 11 and the output gear 12 is performed.

In the baulking step, the sleeve 13 is transported to a meeting position so as to be in contact with the input gear 11.

Through the baulking step, the sleeve 13 enters the full engagement step so as to engage with the input gear 11.

In addition, in FIG. 2, a controller 30 controlling the movement position and time point of the sleeve 13 is illustrated. Specifically, the controller 30 may include a vehicle controller 31, a motor controller 32, and the like previously mounted on the vehicle.

The vehicle controller 31 may determine one mode from among the drive modes depending on a driver request, vehicle information, driving conditions, and the like. In the conversion of the drive modes, the vehicle controller 31 may control the movement of the sleeve 13, thereby engaging or disengaging the dog clutch 10.

For example, the vehicle controller 31 may determine driver request torque by receiving position information of the accelerator pedal, position information of the brake pedal, and the like. The driver request torque may be divided into driving request torque for acceleration driving and braking request torque for deceleration driving or braking.

The vehicle controller 31 may determine a torque command heading to the drive unit 20, according to the driver request torque. The motor controller 32 may control the drive unit 20 according to the torque command received from the vehicle controller 31.

Specifically, the motor controller 32 controls the output torque and speed of the drive unit 20 by driving the drive unit 20 according to the command received from the vehicle controller 31 and transmits actual torque and actual speed information, obtained due to the operation of the drive unit 20, to the vehicle controller 31.

In addition, the vehicle controller 31 may receive the speed information of the drive wheel 24 from a wheel speed sensor 25 disposed on the drive wheel 24 and estimate the speed of the output gear 12 on the basis of the speed information of the drive wheel 24.

In addition, the vehicle controller 31 may determine a target synchronization speed of the input gear 11, determine a target torque command and a target speed command on the basis of the target synchronization speed, and transmit the target torque command and the target speed command to the motor controller 32.

At the same time, the vehicle controller 31 may receive the position information of the sleeve 13 of the sleeve actuator 15 and send a current command (i.e., a control current) for controlling the operation of the sleeve actuator 15 on the basis of the position information. The vehicle controller 31 may locate the sleeve 13 on the basis of operation state information of the sleeve actuator 15.

The sleeve actuator 15 may operate according to the current command of the vehicle controller 31 to move the sleeve 13, so that the sleeve 13 moved in this manner may allow or disallow the force transmitted to the input gear 11 to be transmitted to the output gear 12.

Figure 5:
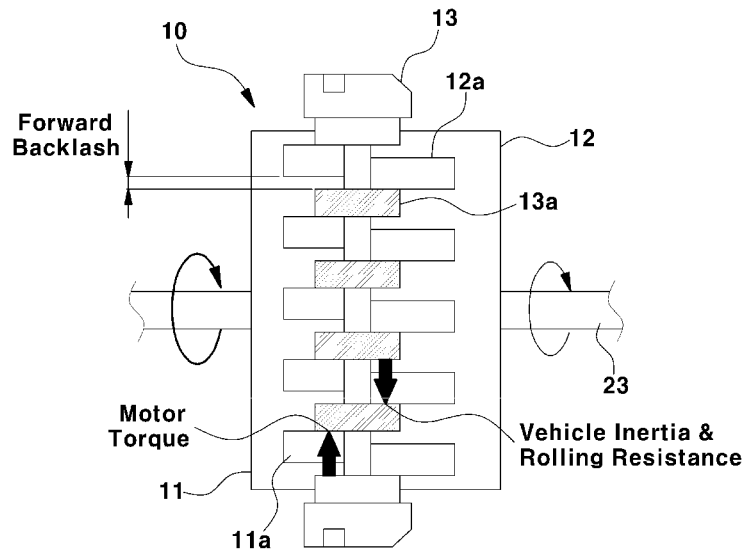
FIG. 5 illustrates forces acting on the sleeve in acceleration driving.
Figure 6:
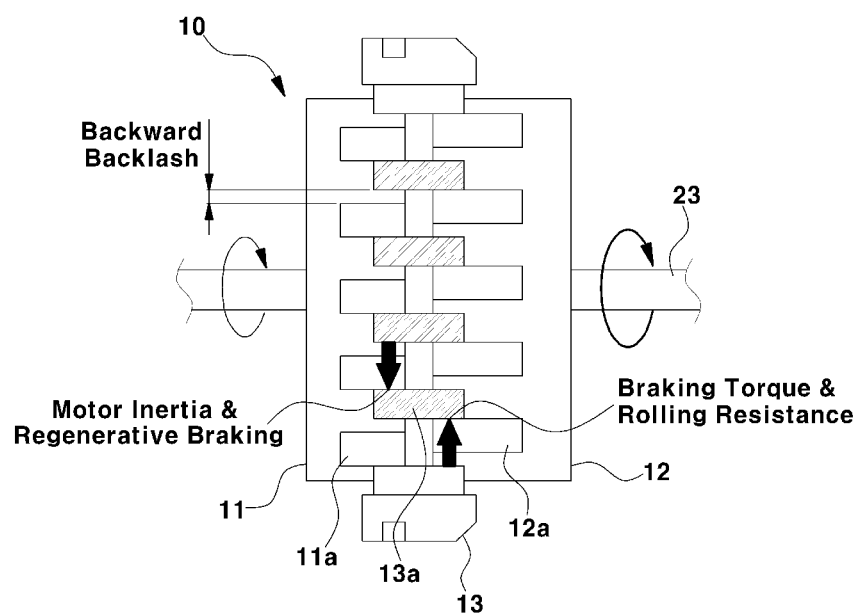
FIG. 6 illustrates forces acting on the sleeve in deceleration driving.
Figure 7:
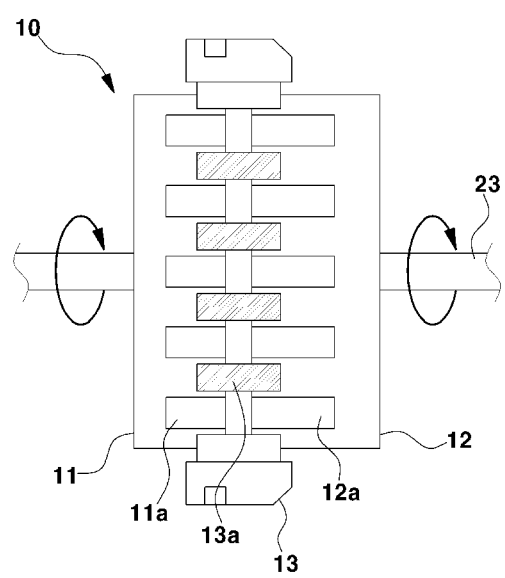
FIG. 7 illustrates a no-load state acting on the sleeve in constant speed driving.

FIGS. 5 to 7 illustrate forces acting on the sleeve depending on driving conditions of the vehicle. Specifically, FIG. 5 illustrates forces acting on the sleeve in acceleration driving, FIG. 6 illustrates forces acting on the sleeve in deceleration driving, and FIG. 7 illustrates a no-load state acting on the sleeve in constant speed driving.

First, referring to FIG. 7, in the constant speed driving, the input gear 11 and the output gear 12 rotate at the same speed, so that the sleeve 13 is in the no-load state. Gear teeth 13a of the sleeve 13 remain in engagement with teeth 11a of the input gear 11 and teeth 12a of the output gear 12.

In acceleration driving, the speed of the input gear 11 is increased to be higher than the speed of the output gear 12 so that the drive unit 20 accelerates the drive wheel 24 to a predetermined speed or higher. Thus, when the dog clutch 10 is engaged, as illustrated in FIG. 5, the teeth 11a of the input gear 11 are in contact with the gear teeth 13a of the sleeve 13, and the teeth 12a of the output gear 12 are in contact with the gear teeth 13a of the sleeve 13. The torque of the drive unit 20 is transmitted to one-side surfaces (i.e. first surfaces) of the gear teeth 13a through the teeth 11a of the input gear 11, while the inertial force and rolling resistance of the vehicle are applied to other-side surfaces (i.e. second surfaces) of the gear teeth 13a through the teeth 12a of the output gear 12.

The first surfaces are the rear surfaces of the sleeve gear teeth 13a with respect to the direction of rotation of the input gear 11, while the second surfaces are the front surfaces of the sleeve gear teeth 13a with respect to the direction of rotation of the input gear 11.

In addition, in deceleration driving, the speed of the input gear 11 is reduced to be lower than the speed of the output gear 12 so that the drive unit 20 decelerates the drive wheel 24 to a speed lower than the predetermined speed. Thus, when the dog clutch 10 is engaged, as illustrated in FIG. 6, the braking torque and rolling resistance of the drive wheel 24 are applied to the first surfaces of the sleeve gear teeth 13a through the teeth 12a of the output gear 12, while the inertial force and regenerative braking of the drive unit 20 are applied to the second surfaces of the sleeve gear teeth 13a through the teeth 11a of the input gear 11.

The dog clutch 10 as described above may have gear teeth collision and impact noise in acceleration driving and deceleration driving, due to backlash present between the teeth 11a of the input gear 11 and the gear teeth 13a of the sleeve 13.

In order to prevent the gear teeth collision occurring due to the backlash in the engagement of the dog clutch 10, the controller 30 performs speed synchronization control to remove the backlash in acceleration driving and deceleration driving. Consequently, when the sleeve 13 completely engages the input gear 11 and the output gear 12, the gear teeth collision may be prevented.

Figure 9B:
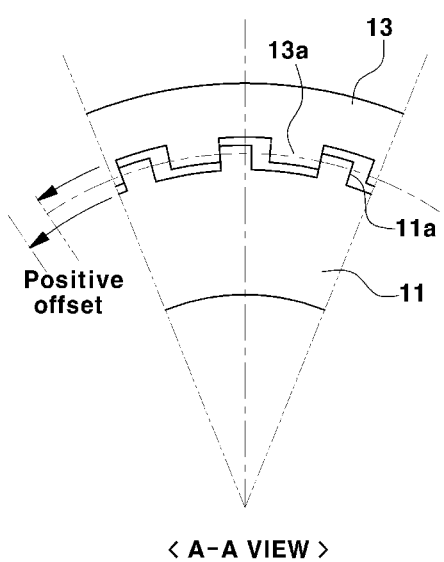
FIG. 9B is a view taken along the line A-A in FIG. 9A.
Figure 10A:
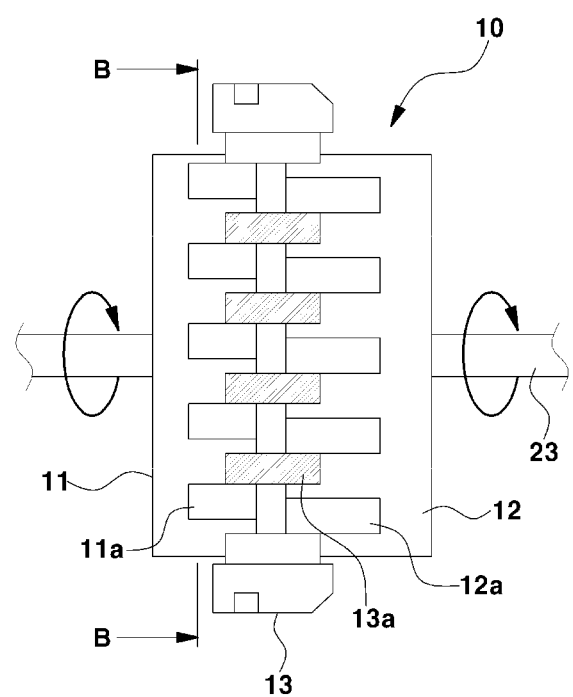
FIG. 10A is a view illustrating a state in which the sleeve has arrived at an engagement position.
Figure 10B:
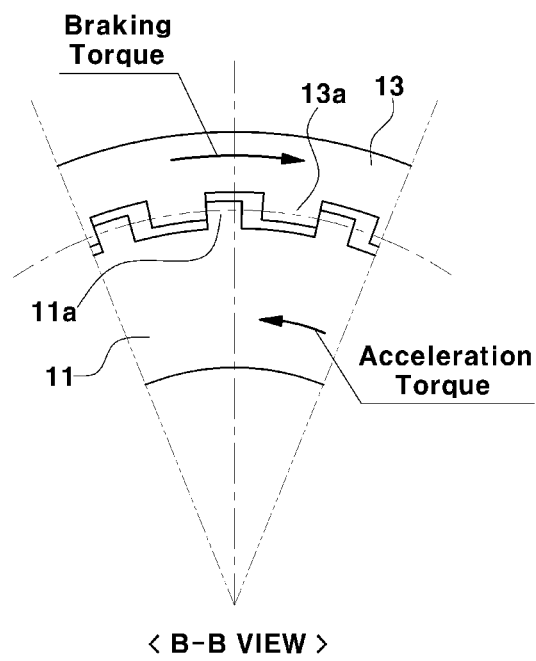
FIG. 10B is a view taken along the line B-B in FIG. 10A.

In the accompanying drawings, FIG. 8 is a flowchart illustrating a dog clutch engagement method according to the present disclosure in acceleration driving, FIGS. 9A and 9B are views illustrating a state in which the sleeve has arrived at a meeting position, and FIGS. 10A and 10B are views illustrating a state in which the sleeve has arrived at an engagement position.

As illustrated in FIG. 8, during driving, driver request torque is compared with predetermined first threshold torque in S10. The first threshold torque may be determined to be a torque value at which the engagement of the dog clutch 10 is requested. That is, the first threshold torque may be determined to be a torque value at which the driver request torque is not satisfied by only two-wheel driving.

Specifically, the first threshold torque may be determined to be a torque value at which the engagement of the dog clutch 10 is requested due to the longitudinal acceleration of the vehicle being a predetermined value or higher. For example, in a case in which the drive unit 20 is the front-wheel motor, when the driver request torque is not satisfied by only the driving force of the rear-wheel motor, the engagement of the dog clutch 10 is required in order to further use the driving force of the front-wheel motor.

Accordingly, when the driver request torque is equal to or greater than the first threshold torque, it is determined that the engagement of the dog clutch 10 is requested during acceleration driving, and in S12, the output speed of the dog clutch 10, i.e. the speed of the output gear 12, is estimated and calculated. The estimated speed of the output gear 12 may be determined on the basis of the speed information of the drive wheel 24.

In S14, the target synchronization speed of the input gear 11 is determined on the basis of the estimated speed of the output gear 12. Specifically, the target synchronization speed is calculated to be a sum of the estimated speed and the offset speed (i.e. estimated speed+offset speed) of the output gear 12.

The offset speed may be determined to be a value at which the backlash between the teeth of the input gear 11 and the teeth of the sleeve 13 is removed in the engagement of the dog clutch 10. Since the offset speed for removing the backlash is considered when determining the target synchronization speed, i.e. the target synchronization speed is calculated and determined to be the sum of the estimated speed and the offset speed of the output gear 12, the sleeve 13 may slide with the surfaces thereof being in contact with the surfaces of the teeth 11a of the input gear 11 when moving toward the engagement position.

In this regard, the offset speed during acceleration driving is determined to be a positive value at which the target synchronization speed is set to be a value greater than the estimated speed of the output gear 12. That is, when the engagement of the dog clutch 10 is requested during acceleration driving, the target synchronization speed may be determined to be a value greater than the estimated speed of the output gear 12 using the offset speed.

For example, the offset speed during acceleration driving may be determined in advance, on the basis of the speed information of the drive wheel 24, the number and area information of the gear teeth 13a of the sleeve 13, and information regarding the friction area, coefficient of friction, and normal force applied to the friction surfaces between the teeth 11a and 12a of the input gear 11 and the output gear 12 and the gear teeth 13a of the sleeve 13 in the engagement of the dog clutch 10. Specifically, the minimum offset speed may be calculated on the basis of the speed of the drive wheel 24 and the number and area of the gear teeth 13a of the sleeve 13. In addition, the offset speed requested in the engagement of the dog clutch 10 may be determined on the basis of the minimum offset speed and the information regarding the friction area, coefficient of friction, and normal force applied to the friction surfaces between the teeth 11a and 12a of the input gear 11 and the output gear 12 and the gear teeth 13a of the sleeve 13 in the engagement of the dog clutch 10. The number and area information of the gear teeth 13a of the sleeve 13 may be substituted with the number and area information of the teeth 11a and 12a of the input gear 11 and the output gear 12, and the normal force applied to the friction surfaces may be calculated on the basis of the operating current of the sleeve actuator 15.

Afterwards, the drive unit 20 is operated so that the input gear 11 follows the target synchronization speed in S16. In this regard, the torque output of the drive unit 20 is controlled so that the drive unit 20 outputs target torque. The target torque is determined depending on the target synchronization speed.

For example, the vehicle controller 31 transmits the target torque command of the drive unit 20 to the motor controller 32, and the motor controller 32 controls the torque output of the drive unit 20 according to the torque command received from the vehicle controller 31.

As the drive unit 20 is operated to output the target torque, the input gear 11 follows the target synchronization speed. Accordingly, the torque output of the drive unit 20 is controlled, and then, the actual speed of the input gear 11 is compared with the target synchronization speed in S18.

When the actual speed of the input gear 11 reaches the target synchronization speed, a control operation of controlling the drive unit 20 to output zero (0) torque is performed in order to maintain the speed of the input gear 11 to be the value of the target synchronization speed in S20.

When the actual speed of the input gear 11 reaches the target synchronization speed, the output control over the drive unit 20 is performed so that the drive unit 20 outputs zero torque, thereby maintaining the speed of the input gear 11 to be the target synchronization speed.

In order to compensate for the rotational inertia of the drive unit 20, the drive unit 20 may be controlled to actually output torque (i.e. compensation torque) smaller than 0.

In the no-load state in which the drive unit 20 outputs zero torque, the drive current of the sleeve actuator 15 is controlled to transport the sleeve 13 to the meeting position in S22.

The sleeve actuator 15 is internally provided with a Hall sensor, and may transmit Hall count information to the vehicle controller 31. The vehicle controller 31 may locate the sleeve 13 on the basis of the Hall count information. Accordingly, the vehicle controller 31 may determine a position to which the sleeve 13 is to move by controlling the drive current of the sleeve actuator 15. That is, the sleeve actuator 15 may move the sleeve 13 to the determined position according to a current command of the vehicle controller 31.

At the meeting position, the sleeve 13 is in contact, while not engaging, with the input gear 11. That is, when the sleeve 13 arrives at the meeting position, the gear teeth 13a of the sleeve 13 and the teeth 11a of the input gear 11 are at a non-engagement position at which the gear teeth 13a of the sleeve 13 are in contact, while not engaging, with the teeth 11a of the input gear 11.

When the sleeve 13 has arrived at the meeting position as described above, whether or not to synchronize the speed of the input gear 11 and the speed of the output gear 12 is determined by comparing the actual speed of the input gear 11 and the actual speed of the output gear 12.

When the sleeve 13 has arrived at the meeting position and is in contact with the input gear 11, slip and friction occur due to the difference in speed between the sleeve 13 and the input gear 11 to reduce the difference in speed, thereby enabling the speed synchronization.

Accordingly, when the speed of the input gear 11 and the speed of the output gear 12 are synchronized, the sleeve 13 is moved to the engagement position by current control over the sleeve actuator 15, thereby completing the engagement of the dog clutch 10 in S26.

The engagement position is a position at which the input gear 11 and the output gear 12 are to be completely coupled to each other. Thus, as the sleeve 13 arrives at the engagement position, the input gear 11 and the output gear 12 may rotate integrally.

At the meeting position at which the sleeve 13 is in contact, while not engaging, with the input gear 11 as illustrated in FIGS. 9A and 9B, when the sleeve 13 is moved to the engagement position as illustrated in FIGS. 10A and 10B, the sleeve 13 moves toward the input gear 11, with the front surfaces of the gear teeth 13a thereof with respect to the direction of rotation thereof remaining in contact with the teeth 11a of the input gear 11.

In other words, when the sleeve 13 moves to the engagement position at which the input gear 11 and the output gear 12 are to be coupled, the sleeve 13 slides to the engagement position, with the surfaces of the gear teeth 13a thereof being in contact with the surfaces of the teeth 11a of the input gear 11.

As illustrated in FIG. 10B, the engagement of the dog clutch 10 is performed, with the front surfaces of the sleeve gear teeth 13a thereof being in contact with the teeth 11a of the input gear 11. Thus, after the engagement is completed, the impact noise due to the gear teeth collision between the sleeve 13 and the input gear 11 is not generated.

That is, since the engagement of the dog clutch 10 is performed, with the front surfaces of the sleeve gear teeth 13a thereof being in contact with the teeth 11a of the input gear 11, after the sleeve 13 has moved to the engagement position, no teeth surface collision due to acceleration driving occurs.

Before the engagement of the dog clutch 10 is requested (i.e. in two-wheel driving), the drive unit 20 remains in a stopped state and does not operate.

Figure 11:
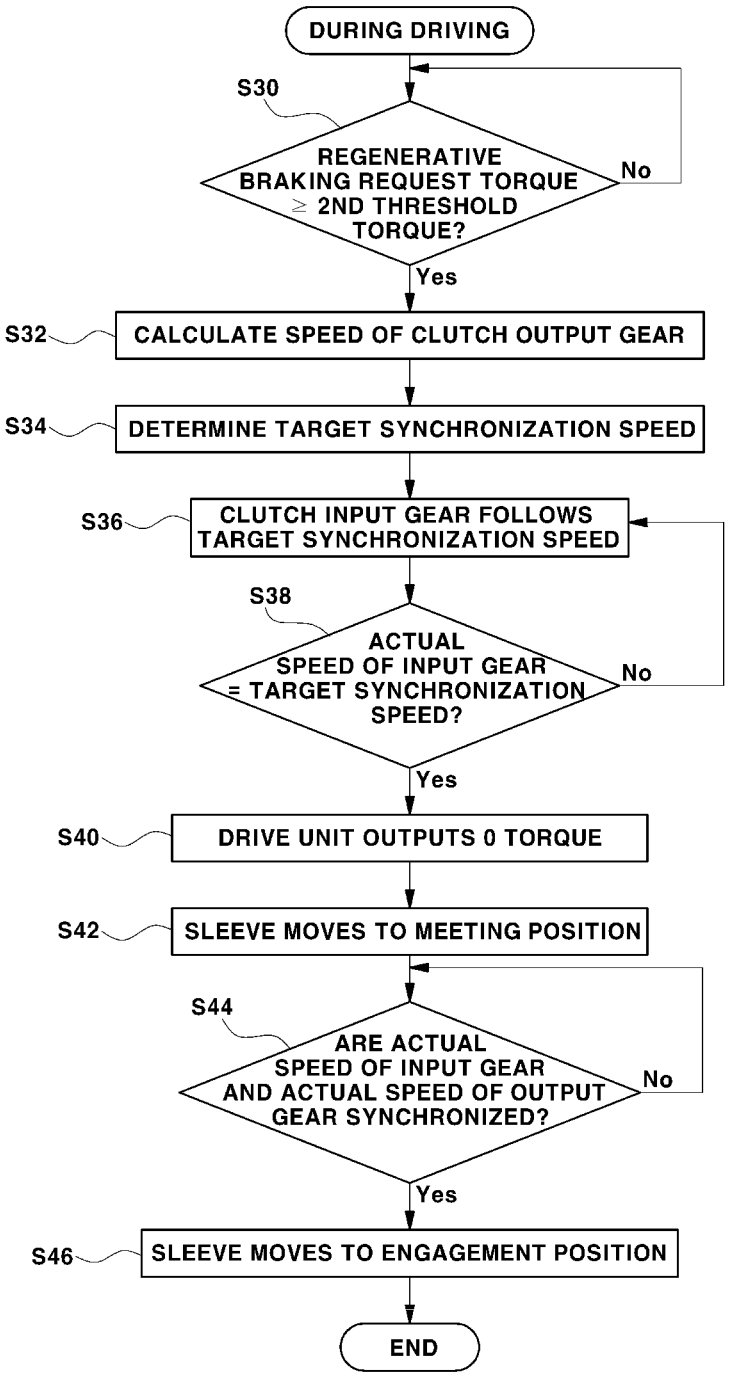
FIG. 11 is a flowchart illustrating the dog clutch engagement method according to the present disclosure in deceleration driving.
Figure 12A:
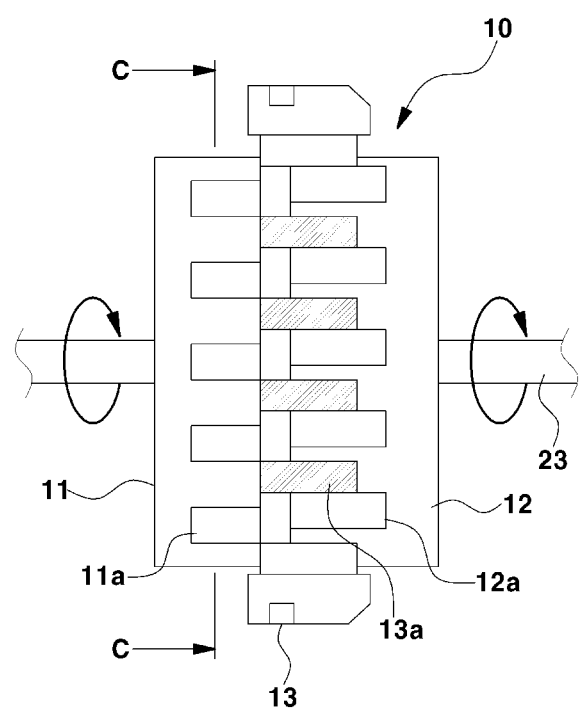
FIG. 12A is a view illustrating a state in which the sleeve has arrived at a meeting position.
Figure 12B:
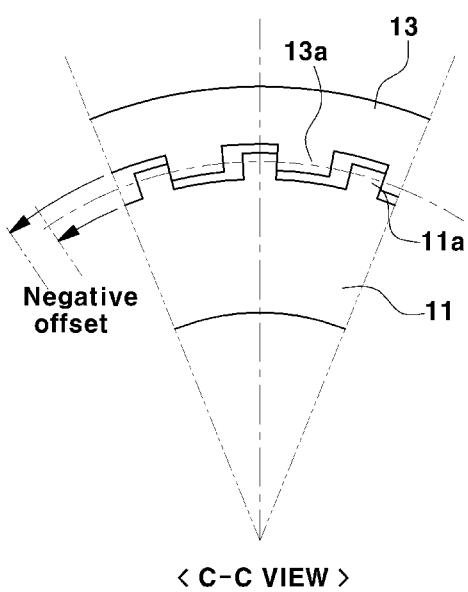
FIG. 12B is a view taken along the line C-C in FIG. 12A.
Figure 13A:
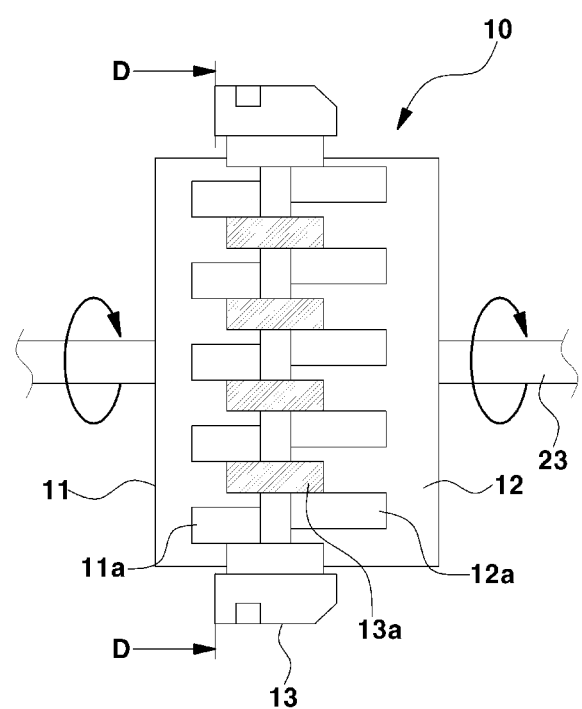
FIG. 13A is a view illustrating a state in which the sleeve has arrived at an engagement position.
Figure 13B:
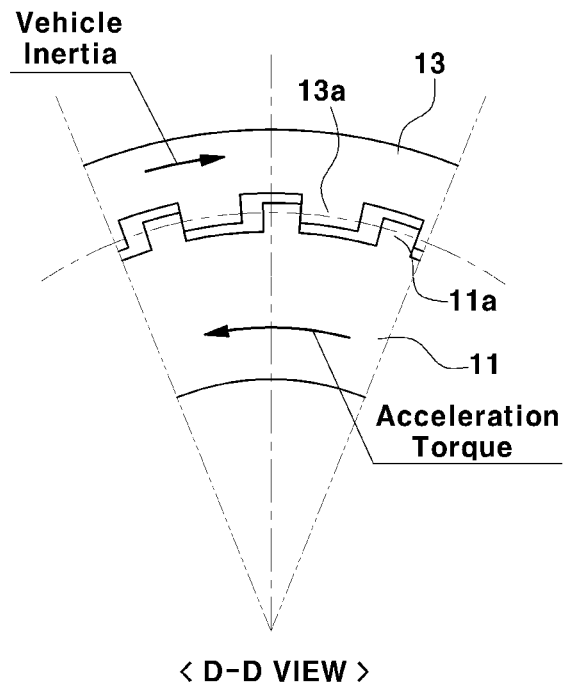
FIG. 13B is a view taken along the line D-D in FIG. 13A.
Figure 14:
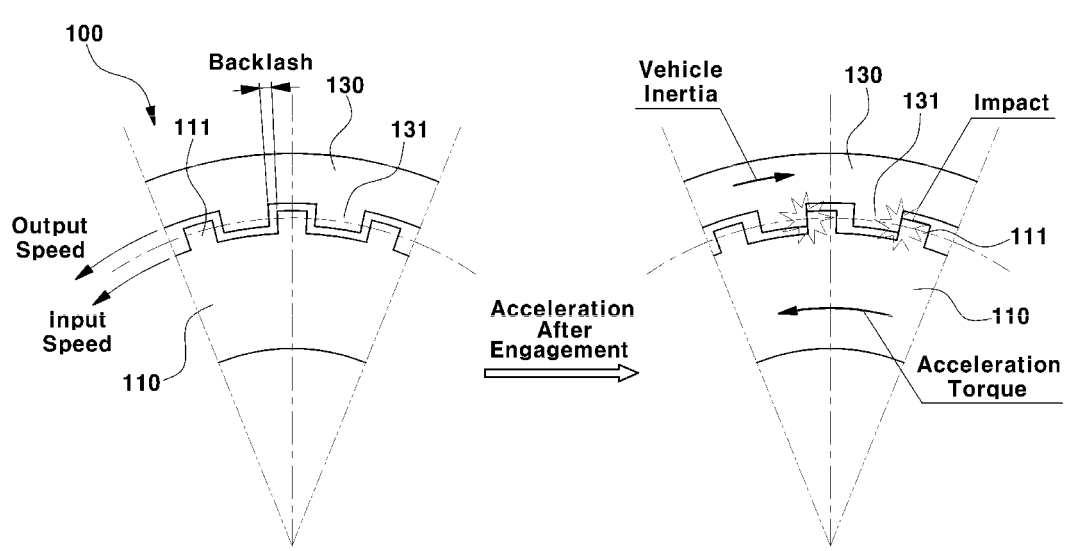
FIGS. 14 and 15 (RELATED ART) are views illustrating problems caused by the backlash of a dog clutch of the related art.
Figure 15:
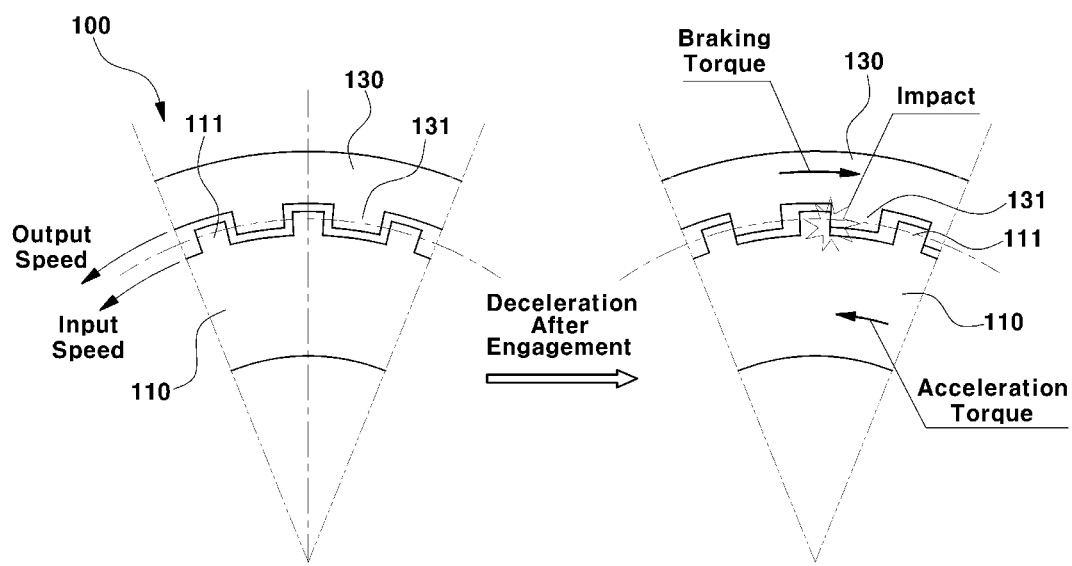

In the accompanying drawings, FIG. 11 is a flowchart illustrating the dog clutch engagement method according to the present disclosure in deceleration driving, FIGS. 12A and 12B are views illustrating a state in which the sleeve has arrived at a meeting position, and FIGS. 13A and 13B are views illustrating a state in which the sleeve has arrived at an engagement position.

As illustrated in FIG. 11, during driving, regenerative braking request torque is compared with predetermined second threshold torque in S30. The second threshold torque may be determined to be a torque value at which the engagement of the dog clutch 10 is requested. That is, the second threshold torque may be determined to be a torque value at which the regenerative braking request torque is not satisfied by only two-wheel driving.

Specifically, the second threshold torque may be determined to be a torque value at which the engagement of the dog clutch 10 is requested due to the longitudinal deceleration of the vehicle being a predetermined value or higher. For example, in a case in which the drive unit 20 is the front-wheel motor, when the regenerative braking request torque is not satisfied by only regenerative braking using the rear-wheel motor, the engagement of the dog clutch 10 is required in order to further use the regenerative braking of the front-wheel motor.

Accordingly, when driver braking request torque is equal to or greater than the second threshold torque, it is determined that the engagement of the dog clutch 10 is requested during deceleration driving, and in S32, the output speed of the dog clutch 10, i.e. the speed of the output gear 12, is estimated and calculated. The estimated speed of the output gear 12 may be determined on the basis of the speed information of the drive wheel 24.

In S34, the target synchronization speed of the input gear 11 is determined on the basis of the estimated speed of the output gear 12. Specifically, the target synchronization speed is calculated to be a sum of the estimated speed and the offset speed (i.e. estimated speed+offset speed) of the output gear 12.

The offset speed may be determined to be a value at which the backlash between the teeth of the input gear 11 and the teeth of the sleeve 13 is removed in the engagement of the dog clutch 10. Since the offset speed for removing the backlash is considered when determining the target synchronization speed, i.e. the target synchronization speed is calculated and determined to be the sum of the estimated speed and the offset speed of the output gear 12, the sleeve 13 may slide with the surfaces thereof being in contact with the surfaces of the teeth 11a of the input gear 11 when moving toward the engagement position.

In this regard, during acceleration driving, the offset speed is determined to be a negative value at which the target synchronization speed is set to be a value smaller than the estimated speed of the output gear 12. That is, when the engagement of the dog clutch 10 is requested during deceleration driving, the target synchronization speed may be determined to be a value smaller than the estimated speed of the output gear 12 using the offset speed.

For example, the offset speed during deceleration driving may be determined in advance on the basis of the same information as during acceleration driving.

Afterwards, the drive unit 20 is operated so that the input gear 11 follows the target synchronization speed in S36. In this regard, the torque output of the drive unit 20 is controlled so that the drive unit 20 outputs target torque. The target torque is determined depending on the target synchronization speed.

For example, the vehicle controller 31 transmits the target torque command of the drive unit 20 to the motor controller 32, and the motor controller 32 controls the torque output of the drive unit 20 according to the torque command received from the vehicle controller 31.

As the drive unit 20 is operated to output the target torque, the input gear 11 follows the target synchronization speed. Accordingly, the actual speed of the input gear 11 is compared with the target synchronization speed in S38.

When the actual speed of the input gear 11 reaches the target synchronization speed, a control operation of controlling the drive unit 20 to output zero torque is performed in order to maintain the speed of the input gear 11 to be the value of the target synchronization speed in S40.

When the actual speed of the input gear 11 reaches the target synchronization speed, the output control over the drive unit 20 is performed so that the drive unit 20 outputs zero torque, thereby maintaining the speed of the input gear 11 to be the target synchronization speed.

In the no-load state in which the drive unit 20 outputs zero torque, the drive current of the sleeve actuator 15 is controlled to transport the sleeve 13 to the meeting position in S42.

At the meeting position, the sleeve 13 is in contact, while not engaging, with the input gear 11. That is, when the sleeve 13 arrives at the meeting position, the gear teeth 13a of the sleeve 13 and the teeth 11a of the input gear 11 are in a non-engagement position at which the gear teeth 13a of the sleeve 13 are in contact, while not engaging, with the teeth 11a of the input gear 11.

When the sleeve 13 has arrived at the meeting position as described above, whether or not to synchronize the speed of the input gear 11 and the speed of the output gear 12 is determined by comparing the actual speed of the input gear 11 and the actual speed of the output gear 12.

When the sleeve 13 has arrived at the meeting position and is in contact with the input gear 11, slip and friction occur due to the difference in speed between the sleeve 13 and the input gear 11 to reduce the difference in speed, thereby enabling the speed synchronization.

Accordingly, when the speed of the input gear 11 and the speed of the output gear 12 are synchronized, the sleeve 13 is moved to the engagement position by current control over the sleeve actuator 15, thereby completing the engagement of the dog clutch 10 in S46.

The engagement position is a position at which the input gear 11 and the output gear 12 are to be completely coupled to each other. Thus, as the sleeve 13 arrives at the engagement position, the input gear 11 and the output gear 12 may rotate integrally.

At the meeting position at which the sleeve 13 is in contact, while not engaging, with the input gear 11 as illustrated in FIGS. 12A and 12B, when the sleeve 13 is moved to the engagement position as illustrated in FIGS. 13A and 13B, the sleeve 13 moves toward the input gear 11, with the rear surfaces of the gear teeth 13a thereof with respect to the direction of rotation thereof remaining in contact with the teeth 11a of the input gear 11.

As illustrated in FIG. 13B, the engagement of the dog clutch 10 is performed, with the rear surfaces of the sleeve gear teeth 13a thereof being in contact with the teeth 11a of the input gear 11. Thus, after the engagement is completed, the impact noise due to the gear teeth collision between the sleeve 13 and the input gear 11 is not generated.

That is, since the engagement of the dog clutch 10 is performed, with the rear surfaces of the sleeve gear teeth 13a thereof being in contact with the teeth 11a of the input gear 11, after the sleeve 13 has moved to the engagement position, no teeth surface collision due to acceleration driving occurs.

For reference, the drive unit 20 remains in a stopped position at which counter electromotive force of the drive wheel 24 is not applied before the engagement of the dog clutch 10 is requested.

In the dog clutch engagement method according to the present disclosure as set forth above, when the sleeve 13 moves to the meeting position, the input gear 11 follows the target synchronization speed including the offset speed. Thus, the input gear 11 arrives at the meeting position after having rotated more than the sleeve 13. Before the sleeve 13 moves to the engagement position, the gear teeth 13a of the sleeve 13 are in a slidable position while remaining in contact with the teeth 11a of the input gear 11. Consequently, when the sleeve 13 moves to the engagement position, the sleeve 13 slides, with the gear teeth surfaces thereof being in contact with the teeth surfaces of the input gear 11. Accordingly, the collision between the gear teeth caused by the backlash and resultant impact noise may be prevented during acceleration driving or deceleration driving.

Although the specific embodiments of the present disclosure have been described in detail, the terms or words used herein and in the appended claims should not be interpreted as being limited merely to common and dictionary meanings. In addition, since the embodiments described herein and the features illustrated in the drawings are merely examples of the present disclosure, the scope of the present disclosure is not limited to the foregoing embodiments. Those skilled in the art will could make various modifications and improvements on the basis of the principle of the present disclosure defined in the appended claims without departing from the scope of the present disclosure as defined in the appended claims.

What is claimed is:

1. A method of engaging a dog clutch of an electric four-wheel drive vehicle, the dog clutch comprising an input gear connected to a drive unit, an output gear connected to a drive wheel, and a sleeve engaging or disengaging the input gear and the output gear while being fitted to the output gear, the method comprising:
when dog clutch engagement is requested during driving, determining a target synchronization speed of the input gear to be a sum of an estimated speed and an offset speed of the output gear;
operating the drive unit so that the input gear follows the target synchronization speed;
when an actual speed of the input gear reaches the target synchronization speed, moving the sleeve to a meeting position at which the sleeve is in contact with the input gear;
when the actual speed of the input gear is synchronized with an actual speed of the output gear, transporting the sleeve to an engagement position at which the input gear and the output gear are coupled; and
when the dog clutch engagement is requested during deceleration driving, the offset speed is determined to be a negative value.

2. The method according to claim 1, wherein when the actual speed of the input gear reaches the target synchronization speed, the drive unit is controlled to output zero torque.

3. The method according to claim 1, wherein when the dog clutch engagement is requested during acceleration driving, the offset speed is determined to be a positive value.

4. The method according to claim 1, wherein when the sleeve is moved to the engagement position at which the input gear and the output gear are coupled, the sleeve slides to the engagement position, with surfaces of gear teeth thereof being in contact with teeth surfaces of the input gear.

5. The method according to claim 1, wherein the estimated speed of the output gear is calculated in accordance with speed information of the drive wheel.

6. The method according to claim 1, wherein the sleeve is coupled to the output gear so as to be axially movable and is configured to rotate integrally with the output gear.

7. The method according to claim 1, wherein the drive unit is one more from among a front-wheel motor generating driving force of a front wheel and a rear-wheel motor generating driving force of a rear wheel.

* * * * *